United States Patent [19]

Konopka

[11] Patent Number: 4,937,731

[45] Date of Patent: Jun. 26, 1990

[54] POWER SUPPLY WITH AUTOMATIC INPUT VOLTAGE DOUBLING

[75] Inventor: John G. Konopka, Barrington, Ill.

[73] Assignee: Zenith Electronics Corporation, Glenview, Ill.

[21] Appl. No.: 410,766

[22] Filed: Sep. 21, 1989

[51] Int. Cl.[5] .......................................... H02M 7/10
[52] U.S. Cl. .................... 363/143; 323/301; 323/346; 363/61
[58] Field of Search ...................... 323/247, 301, 346; 363/61, 142, 143

[56] References Cited

U.S. PATENT DOCUMENTS

| | | | |
|---|---|---|---|
| 4,441,149 | 4/1984 | Hase | 323/346 |
| 4,608,498 | 8/1986 | Falzarano et al. | 363/142 |
| 4,780,805 | 10/1988 | Chewuk et al. | 363/143 |
| 4,837,672 | 6/1989 | Donze | 363/143 |

FOREIGN PATENT DOCUMENTS 67873  4/1984  Japan .................... 363/143

OTHER PUBLICATIONS

"120/220 VAC Auto-Ranging, Battery Supported, High Voltage Supply", IBM Tech Discl. Bul., vol 30, No. 6, pp 431-433, Nov. 1987.

Primary Examiner—William H. Beha, Jr.

[57] ABSTRACT

An automatic input switching circuit for a power supply includes a transformer with two primary windings, normally connected in series and connectible in parallel by relay contacts for operation in a doubler mode. The secondary winding supplies a rectifier for developing a DC output voltage and a voltage doubler for developing a higher voltage than the output voltage. The voltage doubler charges a capacitor that stores energy for operating the relay when a transistor switch is closed. The transistor switch is normally held in a nonconductive state by an inhibit transistor driven from a comparator that switches states when the voltage across the capacitor reached a predetermined level. A voltage sensing arrangement compares the rectifier output voltage with a reference voltage and when it reaches a certain level, another comparator switches states to activate a disable transistor. The activated disable transistor prevents cutting off of the inhibit transistor, thus preventing operation of the transistor switch. The arrangement may be used above as an automatic voltage doubler power supply with line isolation or, by adding additional relay contacts, as a relay control device for controlling normal doubling mode switching in a high current, switched mode power supply.

11 Claims, 1 Drawing Sheet

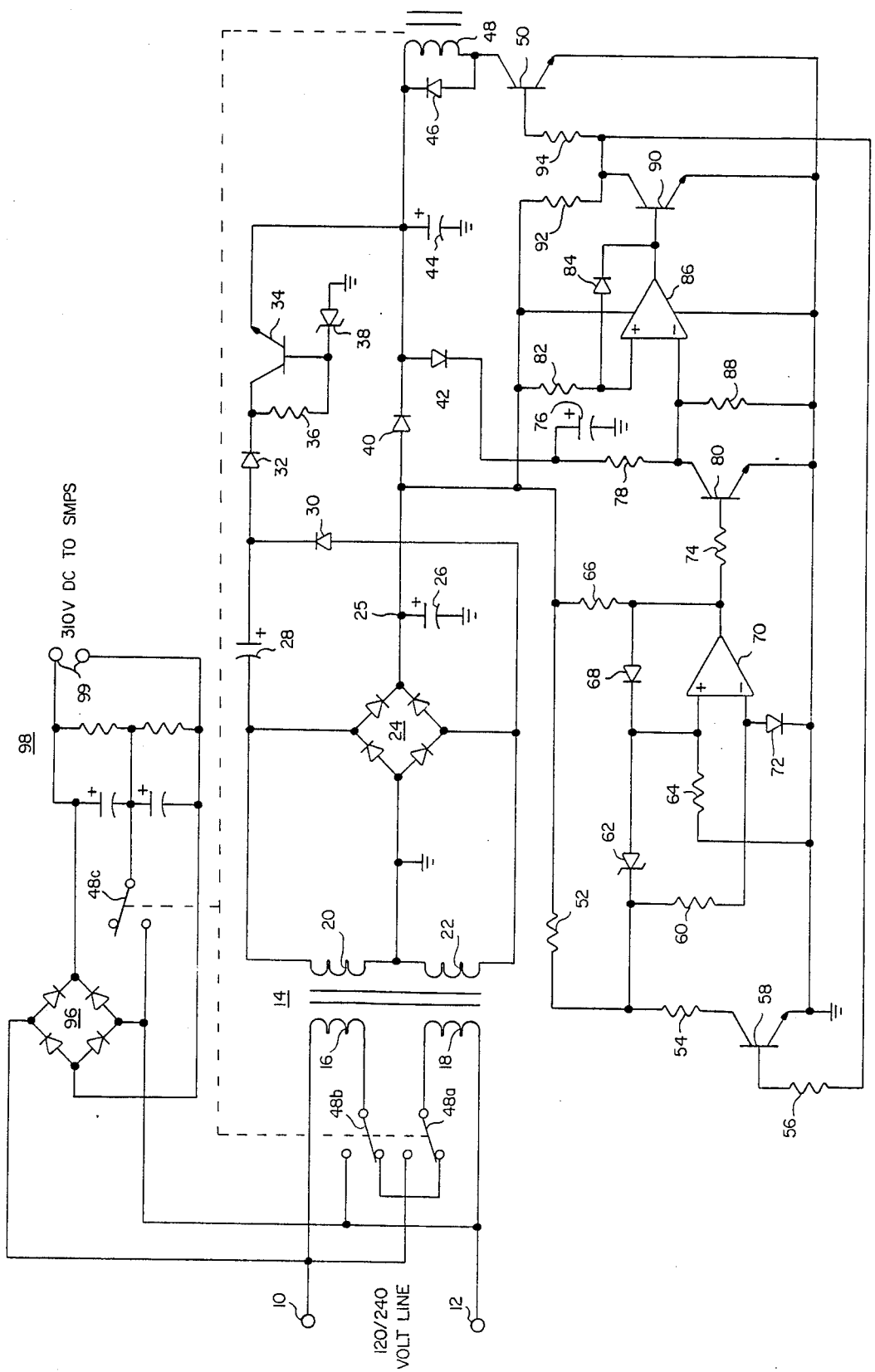

POWER SUPPLY WITH AUTOMATIC INPUT VOLTAGE DOUBLING

BACKGROUND OF THE INVENTION AND PRIOR ART

This invention relates to voltage doubler arrangements for power supplies and particularly to automatic voltage doubler switches.

U.S. Pat. No. 4,665,323, entitled ELECTRONICALLY SWITCHABLE POWER SOURCE, issued May 12, 1987, to Russell, Salata and Stevens, and assigned to Zenith Electronics Corporation, describes a DC power source that automatically adapts to the 120 volt AC or 240 volt AC line input to produce a single range of regulated output voltage. The circuit utilizes a plurality of comparators for determining when the circuit should switch to the voltage doubler mode. It also includes a Triac that is supplied with a DC trigger voltage for switching between the two operating modes.

U.S. Pat. No. 4,783,729, entitled AUTOMATIC VOLTAGE DOUBLER SWITCH, issued 11/8/88 to the present inventor and assigned to Zenith Electronics Corporation, discloses an automatic voltage doubler switch including a Triac, the gate electrode of which is driven by a relaxation oscillator that includes a Diac switch. A capacitor is charged from a voltage that is indicative of the AC line voltage and triggers the Triac through the Diac switch to complete a conductive path for converting the power supply from a direct operating mode to a voltage doubler operating mode. A cutoff transistor senses the AC line voltage and functions to disable the relaxation oscillator when the AC line is at a particular level. A hysteresis circuit reduces the resistance in the base circuit of the line voltage sensing transistor to keep it in conduction despite further drops in line voltage. A hysteresis inhibit transistor operates on power up of the power supply to temporarily override the hysteresis circuit.

U.S. Pat. No. 4,805,083, entitled LOW COST AUTOMATIC VOLTAGE DOUBLER SWITCH, issued 2/14/89 to the present inventor and assigned to Zenith Electronics Corporation, involves a self-biasing SCR trigger circuit that senses the AC line voltage. The SCR anode and cathode are coupled across a capacitor which is connected in series with a resistor across one of the bridge rectifiers. The capacitor is part of a drive circuit for a Triac. When the DC voltage rises to a predetermined level, the SCR fires and shorts out the capacitor which renders the Triac nonconductive. The capacitor delays the drive current upon start up to permit the SCR trigger to sense the AC line voltage. The capacitor also maintains the Triac and the SCR conductive during phase reversals of the AC line. A switchable RC delay is activated in the voltage doubler mode to delay operation of the SCR trigger.

All of the above patented circuits perform their intended functions satisfactorily. The present invention primarily deals with a problem that is encountered with voltage doublers, including the above type doublers which use a Triac for switching. Due to the voltage drop across a Triac, it is not suitable for switching large currents. For a high current power supply, that is one in which the current is on the order of 10 amperes, a one volt rms. drop across the Triac will generate a 10 watt loss. Even with a very heavy duty Triac, such a loss is unacceptable for most applications. In the present invention, relay contacts are used to perform the switching without loss. A difficulty arises in that if the relay is designed to operate with a predetermined voltage, it will not operate at one-half of that voltage. On the other hand, if the relay is selected to operate at the lower voltage, steps must be taken to protect it when exposed to the full voltage.

In accordance with the invention, a transformer has a pair of similar primary windings. Relay contacts are used to place the primary windings in parallel across the input power lines for 120 volt operation and in series for 240 volt operation. The normal mode or relay contacts position is for 240 volt operation, i.e. operation in a nondoubling mode. A bridge connected rectifier coupled across the secondary winding develops normal DC voltage. A voltage doubler is also coupled across the secondary winding for developing a higher than normal DC voltage. A voltage doubler capacitor is connected across the relay operating winding or coil. The relay coil is energized by relay switching means when the voltage across the capacitor reaches a predetermined level. A voltage sensing circuit checks the normal voltage and operates to disable the relay switching means if the normal voltage rises to a level that indicates that no doubling action is needed.

The inventive arrangement may be used as an isolation type automatic voltage doubler power supply to develop a nominal voltage for both 120 and 240 volt inputs. The inventive arrangement may also be used as a relay switching circuit for switching a high current switched mode power supply (SMPS) in and out of the voltage doubler mode by means of additional relay contacts. Both uses of the invention are contemplated.

OBJECTS OF THE INVENTION

A principal object of the invention is to provide a novel automatic line voltage doubler switch.

Another object of the invention is to provide an automatic line voltage doubler switch that is efficient in operation.

A further object of the invention is to provide an automatic line voltage doubler switch for a high current power supply.

BRIEF DESCRIPTION OF THE DRAWING

These and other objects and advantages of the invention will be apparent upon reading the following description in conjunction with the drawing, the single figure of which depicts a partial schematic diagram of an automatic line voltage doubler switch and high current SMPS constructed in accordance with the invention.

DESCRIPTION OF THE PREFERRED EMBODIMENT

Referring to the single FIGURE of the drawing, two line input terminals 10 and 12 are coupled to a source of 120/240 volts AC power (not shown). As will be described, the circuit of the invention automatically compensates for input line voltages of 120 or 240 volts AC to produce a nominal output voltage. The inventive circuit may be used either as an automatic voltage doubler power supply or as an automatic voltage doubler switch arrangement for controlling a high current SMPS.

A transformer 14 includes a pair of similar primary windings 16 and 18 which are connected, via a pair of contacts 48a and 48b of a relay 48, to place them either in either series or in parallel across line terminals 10 and 12. In the normal mode, the relay is unenergized and primary windings 16 and 18 are connected in series. Two similar secondary windings 20 and 22 of transformer 14 are connected in series with their common terminals being connected to ground. A bridge rectifier arrangement 24 is coupled across secondary windings 20 and 22 and has a nondoubled DC voltage developed at a terminal 25. A voltage doubler circuit is also connected across secondary windings 20 and 22. It includes capacitors 28 and 44, diodes 30 and 32, a transistor 34, a resistor 36, and a zener diode 38. Voltage output terminal 25 is connected to ground through a filter capacitor 26. Zener diode 38 has a breakdown voltage of about 24 volts which turns off transistor 34 after start up.

Capacitor 26 is connected via an isolation diode 40 to capacitor 44 to preclude current flow from capacitor 44 to capacitor 26. Capacitor 44 is also connected to the winding of relay 48 which is bridged by a diode 46 for suppression of spurious signals. The winding of relay 48 is connected in series with the collector-emitter circuit of a switch transistor 50, the emitter of which is connected to ground. Capacitor 44 is also connected through a diode 42 to a voltage divider consisting of resistors 78 and 88 connected in series to ground. Resistor 78 is bypassed to ground by a capacitor 76 and the junction of resistors 78 and 88 is connected to the collector of a disable transistor 80, the emitter of which is connected to ground. A comparator 86 has its negative or inverting terminal connected to the collector of disable transistor 80 and its positive or noninverting terminal connected to capacitor 26 through a resistor 82. The output of comparator 86 is connected to the base of an inhibit transistor 90 having a grounded emitter and a collector that is connected to the junction of a pair of resistors 92 and 94 that are serially connected between capacitor 26 and the base of switch transistor 50. The junction of resistors 92 and 94 is also connected through a resistor 56 to the base of a voltage control transistor 58.

Control transistor 58, when conductive, drops the voltage at the junction of resistors 52 and 54 to one-half the voltage across capacitor 26. A small current flowing from terminal 25, through resistor 52 and resistor 60 and, through a diode 72 to ground creates a voltage bias for the negative terminal of a comparator 70. A zener diode 62 connects the junction of resistors 52 and 54 to the positive terminal of comparator 70 and to ground through a resistor 64. Terminal 25 also supplies the output of comparator 70 through a resistor 66. A diode 68 bridges the output and positive terminals of comparator 70. The output of comparator 70 is connected through a resistor 74 to the base of disable transistor 80.

In operation, terminal 25 normally has 24 volts DC developed thereat. Zener diode 62 has a breakdown voltage of 18 volts and, as mentioned, zener diode 38 breaks down at 24 volts. Relay contacts 48a and 48b are in the normal (nondoubling) mode, with primary windings 16 and 18 connected in series across the line terminals 10 and 12. If the input line voltage is 120 volts, the voltage developed across capacitor 26 (at terminal 25) will only be 12 volts. This is not sufficient to operate relay 48 (which is a 24 volt relay) to switch relay contacts 48a and 48b and thereby connect the primary windings in parallel to double the secondary winding voltage and bring the voltage at terminal 25 to 24 volts. The start up voltage doubler produces twice the normal voltage and as transistor 34 conducts, current flows into capacitor 44 and its voltage begins to rise toward 24 volts. Diode 40 isolates capacitor 44 from capacitor 26 (which only sees a 12 volt potential) and prevents diversion of energy from capacitor 44. The potential at terminal 25 immediately drives inhibit transistor 90 into saturation by virtue of the connection to its base through resistor 82 and diode 84. Collector current is supplied to inhibit transistor 90 through resistor 92. With transistor 90 in saturation, the junction of resistors 92 and 94 will be less than 0.2 volts. Thus switch transistor 50 is cut off and relay 48 is not energized.

The doubler voltage developed across capacitor 44 is supplied to the negative terminal of comparator 86 through diode 42 and the junction of resistors 78 and 88. The positive terminal of comparator 86 is supplied potential from terminal 25 through resistor 82. This voltage is two diode drops from ground or 1.2 volts. In this state, the output of comparator 86 is high. As the voltage of capacitor 44 continues to rise, the voltage at the junction of resistors 78 and 88 raises the negative terminal of comparator 86 to 1.2 volts and comparator 86 changes state to drive its output low. When this occurs, inhibit transistor 90 goes out of saturation, thus permitting the voltage at the junction of resistors 92 and 94 to rise. Current flows from output terminal 25, through resistors 92 and 94 to the base of switch transistor 50, to force switch transistor 50 into saturation. When switch transistor 50 conducts, energy is supplied to the winding of relay 48 from capacitor 44 and relay 48 operates its contacts 48a and 48b. The energy stored in capacitor 44, is sufficient to operate relay 48, but insufficient to keep it operating because of the limited current available through the voltage doubler arrangement. As soon as relay 48 operates, the voltage at terminal 25 rises to its normal 24 volts, and energy is then supplied to the winding of relay 48 through diode 40. The voltage doubler shuts down when zener diode 38 conducts at 24 volts and effectively removes the forward bias on transistor 34.

The input voltage at start up is unknown, and it is essential that the relay not be switched to place the power supply into its doubling mode until the line voltage has been determined. A voltage sensing circuit monitors the potential at terminal 25, which reflects the input line voltage. Resistors 52 and 60, and diode 72 form a voltage divider across capacitor 26 and diode 72 maintains a 0.6 volt reference potential on the negative terminal of comparator 70. The output of comparator 70 is low and diode 68 is reverse biased, thus isolating the positive terminal of comparator 70 from the voltage at terminal 25. If the potential at the junction of resistors 52 and 54 reaches the breakdown potential of zener diode 62, the voltage of the positive terminal of comparator 70 rises. Control transistor 58 is nonconductive due to the conduction of switch transistor 90, which keeps the base of transistor 58 near ground. When the potential at the positive terminal of comparator 70 reaches 0.6 volts, the comparator changes state and its output switches high. When its output goes high, the base of disable transistor 80 is driven positive with respect to its emitter and transistor 80 is driven into saturation. This effectively places the negative terminal of comparator 86 at ground and prevents the comparator 86 from changing states. As long as comparator 86 is in this state, the base of inhibit transistor 90 is forward biased and inhibit transistor 90 is in saturation which prevents switch transistor 50 from conducting and completing a circuit for the winding of relay 48.

It will be appreciated that the start up of the voltage doubler circuit has an inherent delay (about 100 milliseconds in the preferred embodiment) which enables the potential at terminal 25 to be sensed before permitting relay 48 to be activated. If the potential at terminal 25 rises to 18 volts, it is clear that the input line voltage is greater than 165 volts and that the supply must remain in the normal mode, i.e. no voltage doubling. In that event, the voltage sensing circuit operates to drive the disable transistor conductive to prevent cutting off of the inhibit transistor and, in so doing, prevent operation of the switch transistor 50.

If the input line voltage is 120 volts and the relay 48 has been activated to switch the primaries such that the voltage at terminal 25 is at 24 volts, the voltage sensing circuit will see 12 volts (one-half of 24 volts at terminal 25) to preclude disable transistor 80 from being driven conductive. Control transistor 58 performs this function since it is driven conductive whenever switch transistor 50 is conductive to clamp the lower end of resistor 54 near ground potential and prevent the breakdown of zener diode 62 after relay 48 is energized. It should also be noted that diode 68 functions as a latch when comparator 70 changes state and its output goes high since diode 68 causes the positive terminal of comparator 70 to remain positive with respect to the negative terminal.

The high current SMPS that is connected across line terminals 10 and 12 includes a rectifier bridge 96 and a filter arrangement 98 of capacitors and resistors which supply a pair of output terminals 99. Another set of relay contacts 48c connects one corner of the bridge rectifier to the center of the "bulk" capacitors in the filter network and serves to switch the filter arrangement between a normal and a doubling mode.

As discussed above, the power supply circuit previously described may be used as a switch for operating relay contacts 48c for switching the high current SMPS. Alternatively, the switching circuit described can be used as an automatic voltage doubler power supply where the output voltage is taken between output terminal 25 and ground.

It is recognized that numerous changes may be made to the invention without departing from its true spirit and scope. The invention is to be limited only as defined in the claims.

What is claimed is:

1. A relay controlled line voltage switching system comprising:
    transformer means having a pair of switchable primary windings and a secondary winding;
    relay means for switching said primary windings from a normal mode to a voltage doubling mode;
    voltage doubler means coupled to said secondary winding for developing an operating voltage for said relay means;
    relay switching means for energizing said relay means responsive to said voltage doubler means; and
    voltage sensing means for disabling said relay switching means when said line voltage is such that said primary windings are to remain in said normal mode.

2. The system of claim 1 wherein said relay switching means includes:
    a first transistor switch connected in series with said relay means; and
    trigger means for operating said first transistor switch when said voltage doubler means develops a predetermined voltage.

3. The system of claim 2 wherein said trigger means includes:
    a capacitor coupled to said voltage doubler means for developing energy for said relay means;
    a voltage divider coupled across said capacitor;
    an inhibiting transistor; and
    a comparator coupled between said voltage divider and said inhibiting transistor, said comparator switching states in response to the voltage across said capacitor.

4. The system of claim 1 wherein said voltage sensing means includes:
    rectifier means coupled across said secondary winding;
    a capacitor coupled to said rectifier means; and
    transistor disabling means responsive to the voltage across said capacitor, for producing an inhibiting signal.

5. The system of claim 4 wherein said transistor disabling means includes;
    a voltage reference device;
    a comparator connected to said voltage reference device; and
    a disable transistor coupled to the output of said comparator.

6. In combination:
    transformer means having a pair of switchable primary windings and a secondary winding;
    relay means for switching said primary windings from a normal mode to a voltage doubling mode, said relay means including a relay requiring a given voltage for operation;
    voltage doubler means coupled to said secondary winding for developing said given voltage for operating said relay means;
    relay switching means for connecting said voltage doubler means to said relay means when said given voltage is developed;
    rectifier means coupled across said secondary winding and developing a DC output voltage; and
    voltage sensing means for disabling said relay switching means if said DC output voltage is greater than a predetermined level when in said normal mode.

7. The combination of claim 6, further including latch means for maintaining said relay switching means disabled.

8. The combination of claim 6, further including control transistor means activated in response to operation of said relay switching means for changing the response of said voltage sensing means when in said voltage doubling mode.

9. The combination of claim 8 wherein said voltage sensing means includes a reference voltage device, a comparator and a disable transistor, said disable transistor generating an inhibit signal in response to breakdown of said voltage reference device.

10. For use in conjunction with a heavy current switched mode power supply comprising a rectifier bridge and switching means for developing a high current substantially constant DC voltage output from a dual voltage power line input:
    a transformer having first and second primary windings, normally connected in series and a secondary winding;
    a relay for connecting said first and second primary windings in parallel across a power line and for operating said switching means;

rectifying means coupled across said secondary winding for developing a first voltage;

voltage doubler means coupled across said secondary winding for developing a second higher voltage than said first voltage for operating said relay;

a switch transistor coupled in series with said relay;

relay operating means for activating said switch transistor to couple said voltage doubler means to said relay; and line sensing means for sensing said first voltage and disabling said relay switching means when said first voltage reaches a predetermined level.

11. The combination of claim 10, further including:

a first capacitor coupled across said voltage doubler means;

a second capacitor coupled across said rectifying means; and a diode coupled between said first capacitor and said second capacitor for precluding current flow from said first capacitor to said second capacitor.

* * * * *